United States Patent
Boren

(10) Patent No.: US 8,205,428 B2
(45) Date of Patent: Jun. 26, 2012

(54) CAPACITIVE STATOR

(75) Inventor: Dale W. Boren, Azle, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 734 days.

(21) Appl. No.: 12/366,319

(22) Filed: Feb. 5, 2009

(65) Prior Publication Data

US 2010/0192538 A1 Aug. 5, 2010

(51) Int. Cl.
*F03H 1/00* (2006.01)
*H05H 1/00* (2006.01)

(52) U.S. Cl. .......... 60/202; 60/200.1; 60/203.1; 310/11; 310/12.07; 313/359.1; 315/5.14; 315/111.01; 315/111.41; 315/111.81; 331/5

(58) Field of Classification Search .......... 60/200.1, 60/202, 203.1; 310/11, 12.07; 315/111.01, 315/111.11, 111.21, 111.31, 111.41, 111.51, 315/111.61, 111.71, 111.81, 111.91; 331/5
See application file for complete search history.

(56) References Cited

U.S. PATENT DOCUMENTS

| | | | |
|---|---|---|---|
| 3,380,249 A * | 4/1968 | Meckel ............ | 60/202 |
| 4,663,932 A * | 5/1987 | Cox ............. | 60/200.1 |
| 4,891,600 A | 1/1990 | Cox | |
| 4,893,470 A * | 1/1990 | Chang ............ | 60/204 |
| 5,170,623 A * | 12/1992 | Dailey et al. ........ | 60/202 |
| 5,211,006 A | 5/1993 | Sohnly | |
| 5,486,727 A * | 1/1996 | Heidelberg et al. ...... | 310/12.07 |
| 6,142,131 A | 11/2000 | Wortman et al. | |
| 6,644,014 B2 * | 11/2003 | Provitola ........ | 60/202 |
| 6,720,698 B2 | 4/2004 | Galbraith | |
| 6,845,718 B2 | 1/2005 | Fortner et al. | |
| 2006/0150611 A1 * | 7/2006 | Allen ........... | 60/203.1 |
| 2008/0277004 A1 * | 11/2008 | Hagseth et al. ....... | 137/803 |

OTHER PUBLICATIONS

NASA Studies Hypersonic Turbojet Using MHD Energy Bypass Cycle, by Graham Warwick, Flight Global.com, Nov. 29, 2007.

* cited by examiner

*Primary Examiner* — Ehud Gartenberg
*Assistant Examiner* — Michael B Mantyla
(74) *Attorney, Agent, or Firm* — Bracewell & Giuliani LLP

(57) ABSTRACT

A standard 4-pole electric motor stator with capacitive plates in-line with the magnetic poles, but electrically 90° out of phase, produces two Lorentz force geometries 90° out of phase with each other (i.e., vertical, horizontal). An alternating source electrically rotates this pair of Lorentz geometries producing a propagating electromagnetic wave at the source frequency within the vacant internal cavity. Any charged particle within the cavity and along its axis will be accelerated or decelerated from an initial velocity via the Lorentz force. The rotating geometry provides for the coupling of the Lorentz force through a current loop and diamagnetism, providing acceleration and deceleration of non-charged particles. The force coupling is dependent upon the material's electromagnetic properties, the frequencies generated by the capacitive stator, and the velocity of the particles within the capacitive stator's influence.

19 Claims, 6 Drawing Sheets

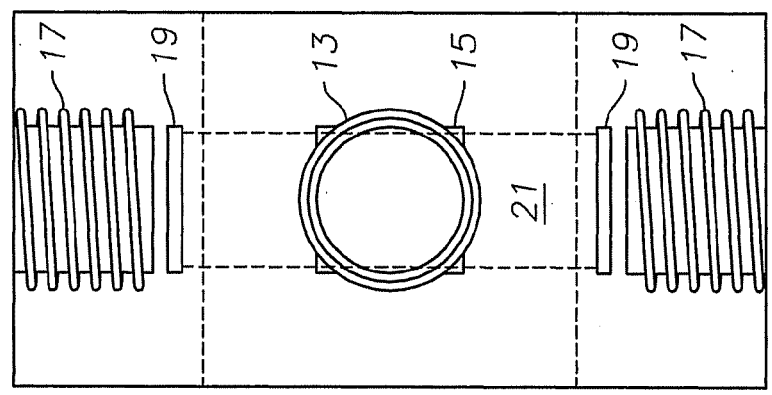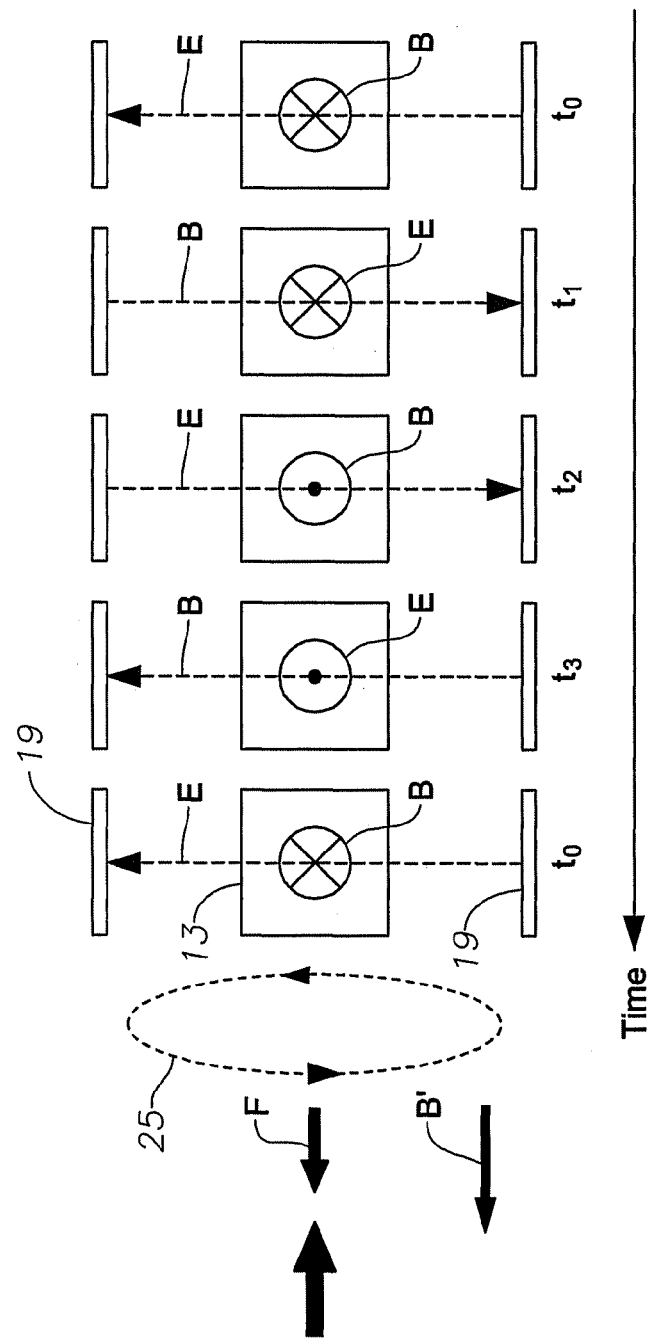
Fig. 7

CAPACITIVE STATOR

FIELD OF THE INVENTION

This invention relates in general to a capacitively augmented electric motor like stator, and in particular this capacitively augmented stator's electromagnetic properties including, but not limited to a rotating Lorentz force geometry.

BACKGROUND OF THE INVENTION

A rail gun consists of two parallel metal rails (hence the name) connected to an electrical power supply and placed within an independent magnetic field perpendicular to the plane in which the rails lay. When a conductive projectile or sled is injected between the rails, an electric current flows through the projectile or sled, between the rails and through the magnetic field. This current flowing through the magnetic field sets up a Lorentz force driving the projectile or sled down the rails.

A capacitive stator is a device which couples electromagnetic energy with matter inducing momentum from a distance. The capacitive stator induces momentum to either charged and/or uncharged gasses (i.e., ionized or non-ionized), liquids, and/or solids. For the charged case, energy coupling is mechanized via the Lorentz force. For the uncharged case, energy coupling is mechanized via diamagnetism.

SUMMARY OF THE INVENTION

A standard 4-pole electric motor stator with capacitive plates in-lined with the magnetic poles, but electrically 90° out of phase, produces two Lorentz force geometries 90° out of phase with each other (i.e., vertical, horizontal). The capacitive stator is used as an electromagnetic turbine to transfer kinetic energy for momentum coupling to move matter. An alternating source electrically rotates this pair of Lorentz geometries producing a propagating electromagnetic wave at the source frequency within the vacant internal cavity. Any charged particle within the cavity and along its axis will be accelerated or decelerated from an initial velocity via the Lorentz force.

Additionally, the rotating Lorentz' geometry enables the coupling of the Lorentz force through an induced current loop and diamagnetism, providing acceleration and deceleration of non-charged particles. This force coupling is dependent upon the material's electromagnetic properties, the frequencies generated by the capacitive stator, and the velocity of the particles within the capacitive stator's influence.

BRIEF DESCRIPTION OF THE DRAWINGS

FIG. 7 is a schematic side view of the capacitive stator as comprised by the present invention employed in intake velocity reduction.

DETAILED DESCRIPTION OF THE INVENTION

Figure 1:
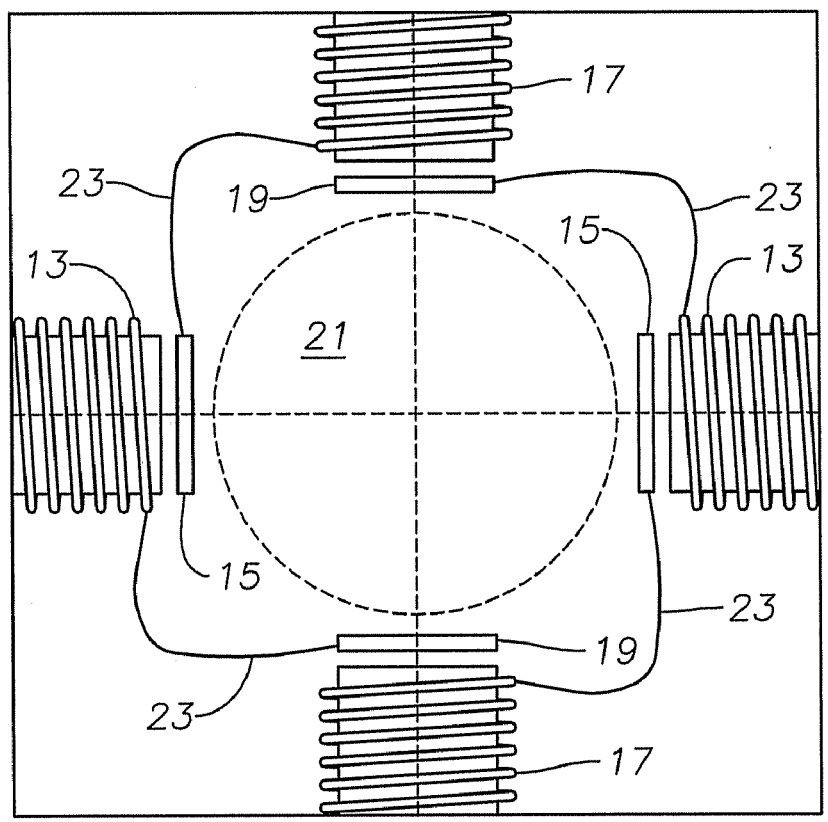
FIG. 1 is a schematic axial view of the capacitive stator as comprised by the present invention.
Figure 2:
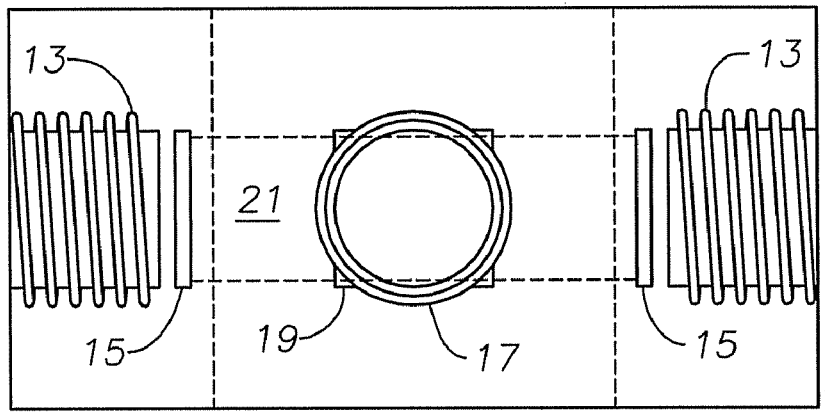
FIG. 2 is a top view of the capacitive stator of FIG. 1.

Referring to FIGS. 1 and 2, a capacitive stator assembly 11 is comprised of a first pair of magnetic coils 13 and their associated paired capacitive plates 19, and a second pair of magnetic coils 17 and their associated paired capacitive plates 15. The first pair of plates 19 are parallel to one another. The second pair of plates 15 are parallel to one another, and perpendicular to the first pair of plates 19. A hollow rotor cavity or passage 21 is formed between the first and second pairs of plates 19, 15. First and second pairs of plates 19, 15 are in-line with the other pair's magnetic poles in the stator assembly 11, that is, the capacitive plate pairs 19, 15 are mechanically 90° out of phase with their associated magnetic poles. Thus, each capacitive plate pair 19, 15 is electrically 90° out of phase with its mechanically inline magnetic pole pair, as indicated by lines 23 that extend between first pair of magnetic coils 13 and the pair of plates labeled 19, and between second pair of magnetic coils 17 and the pair of plates labeled 15. The capacitive stator assembly 11 produces two Lorentz force geometries mechanically 90° out of phase with one another. An alternating source electrically rotates this pair of Lorentz geometries, producing a propagating electromagnetic wave at the source frequency within the vacant internal cavity 21. This geometry produces a rotating Lorentz force creating an electromagnetic turbine, designed to transfer electromagnetic energy to and from kinetic energy. The invention couples electromagnetic energy with the electrical and/or diamagnetic properties of matter to induce a change in kinetic energy (i.e., momentum) of the subjective matter. That is, the energy couples to a material resulting in a transfer of electromagnetic energy to momentum (i.e., pushing the system along).

Any charged particle within cavity 21 and along its axis will be accelerated or decelerated from an initial velocity via the Lorentz force as demonstrated by existing Lorentz force applications (i.e., rail guns, magneto hydrodynamic (MHD) propulsor). Deflection of charged particles may occur due to varying electric potential between paired capacitive plates or varying the magnetic field strength between pairs of magnetic coils as is well known to those skilled in the art. The rotating Lorentz geometry of the capacitive stator assembly 11, however, enables the coupling of the Lorentz force through an induced (i.e., Maxwell) current loop 25 (FIG. 3) to the diamagnetic properties of matter providing acceleration and deceleration of non-charged particles. This force coupling is dependent upon tuning the frequencies generated by the capacitive stator 11 to the material's electromagnetic properties such as, its natural frequency (i.e., permeability, permittivity, etc.) and the material's diamagnetism. The capacitive stator 11 sets up an induced current loop 25 or magnetic dipole (FIG. 3) which is opposed or repelled by the material's diamagnetism. Diamagnetic materials are weakly repellant to an externally applied magnetic field. Diamagnetic materials have no intrinsic magnetic dipole moment, but may have one induced. The induced dipole points in a direction opposite that of the externally applied magnetic field, setting up a repulsive force, thus, converting electromagnetic energy into kinetic energy. The strength of the repulsive force is proportional to the velocity of the flow stream along the capacitive stator's axis.

Figure 3:
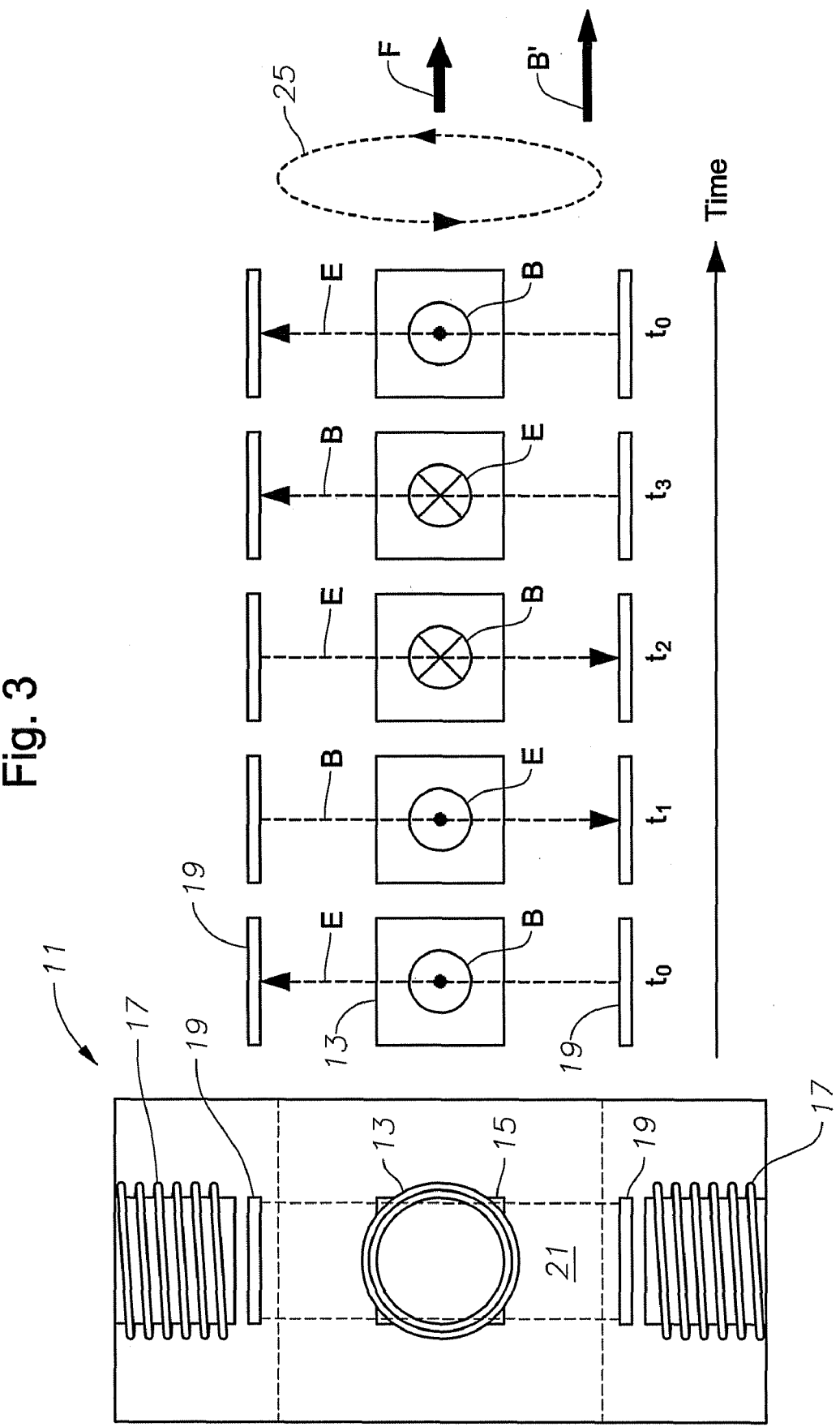
FIG. 3 is a schematic side view of the capacitive stator as comprised by the present invention illustrating driver operation.

Referring to FIG. 3, capacitive stator assembly 11 is employed in a driver operation. As a driver the capacitive stator 11 accelerates matter (gas, liquid, or solid). A current is induced in any conductive material (gas, liquid, or solid) between the electric potential of parallel plates. There are two sets of parallel plates, one orthogonal to the other (i.e., first pair of plates 15, second pair of plates 19). By varying the electrical potential between these pairs of parallel plates 15, 19 a circular Maxwellian current loop can be set up. Also, there are two sets of parallel magnetic coils, one orthogonal to the other (i.e., first pair of coils 17, second pair of coils 13). The pairs of magnetic coils/poles 17, 13 are associated with the pairs of parallel plates (i.e., plates 15 with coils 17 and plates 19 with coils 13) and aligned such that the Lorentz geometrical conditions are met. Thus, the induced current loop 25 is driven down the central axis of the capacitive stator 11 via the Lorentz force. This induced current loop 25 is opposed or repelled by the diamagnetic properties of the material being projected. An induced current of sufficient strength will propel materials of sufficient diamagnetism along the central axis of the capacitive stator 11.

FIG. 3 illustrates that at different time intervals $t_0$, $t_1$, $t_2$, and $t_3$, the continuously rotating magnetic (i.e., field B) and electric (i.e., field E) fields are consistently 90° out of phase. At time $t_0$, the electric field E acts upward between the pair of plates 19, and the magnetic field B acts out of the paper between the pair of coils 13. At time $t_1$, the electric field E acts out of the paper between the pair of plates 15, and the magnetic field B acts downward between the pair of coils 17. At time $t_2$, the electric field E acts downward between the pair of plates 19, and the magnetic field B acts into the paper between the pair of coils 13. At time $t_3$, the electric field E acts into the paper between the pair of plates 15, and the magnetic field B acts upward between the pair of coils 17. This rotating geometry continues this cycle while connected to an alternating source. Alternatively, the electric field E and magnetic field B may rotate in the opposite direction, thus reversing the direction of the Lorentz force F. The direction of rotation of the electric field E and the magnetic field B within cavity 21, and the corresponding direction of the Lorentz force F created by rotation results in the mode difference between stator driver mode (FIG. 3) and stator intake velocity reduction mode (FIG. 7). This rotating geometry induces a current loop 25 within cavity 21 of the capacitive stator 11. The induced current loop 25 also creates a magnetic field B'. The generated current loop 25 will be forced forward by the Lorentz force F and any material (solids, liquids, or gasses) in which the current loop 25 resides will be brought along.

For non-conducting materials, at the appropriate frequency, the virtual (i.e., Maxwellian) current loop 25 couples with the material's diamagnetic properties. Diamagnetism is the primary coupling property for non-conductive materials generating a repellant force to the induced current loop 25 within the material.

Figure 4:
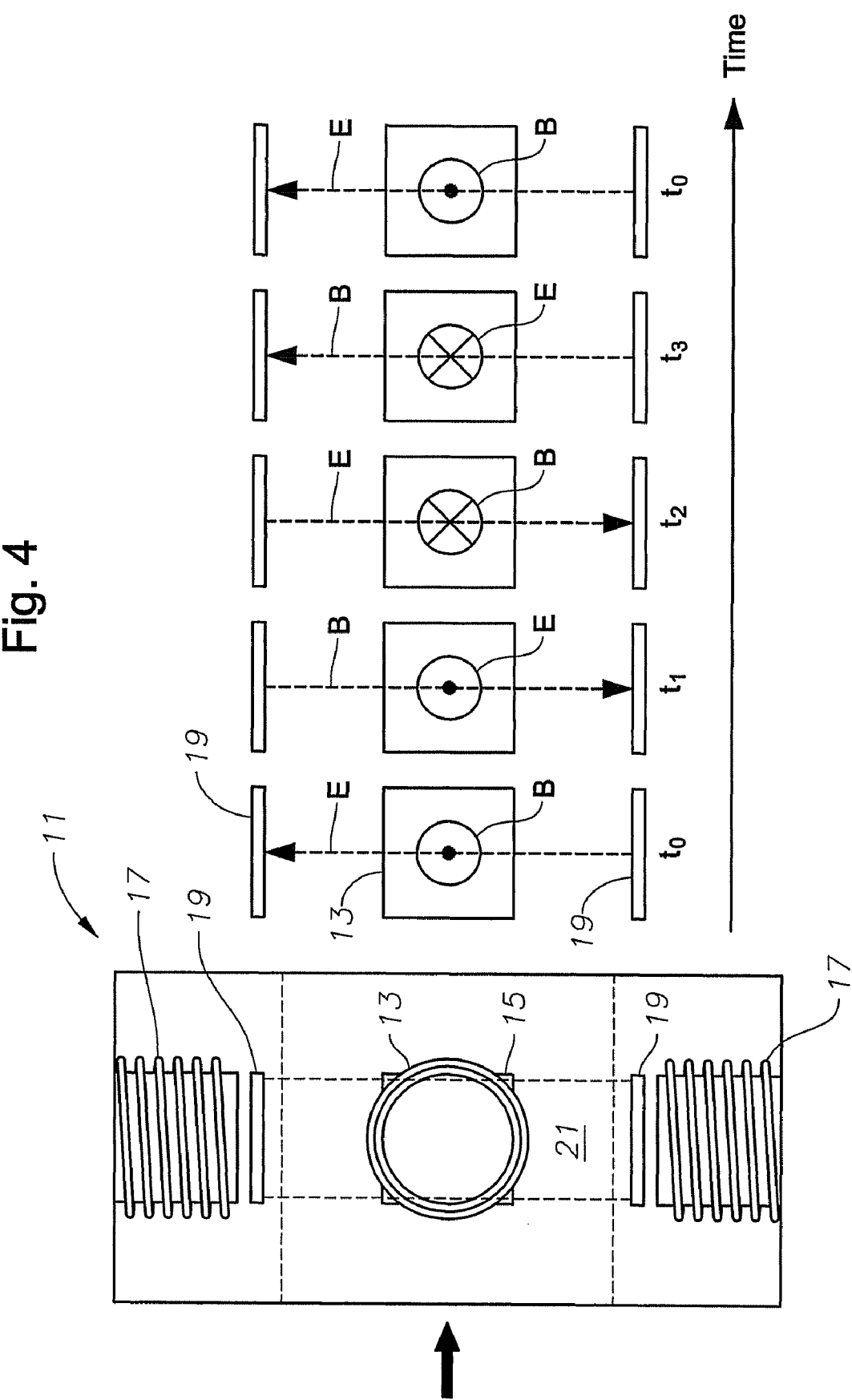
FIG. 4 is a schematic side view of the capacitive stator as comprised by the present invention employed in plume signature and thrust vectoring.
Figure 5:
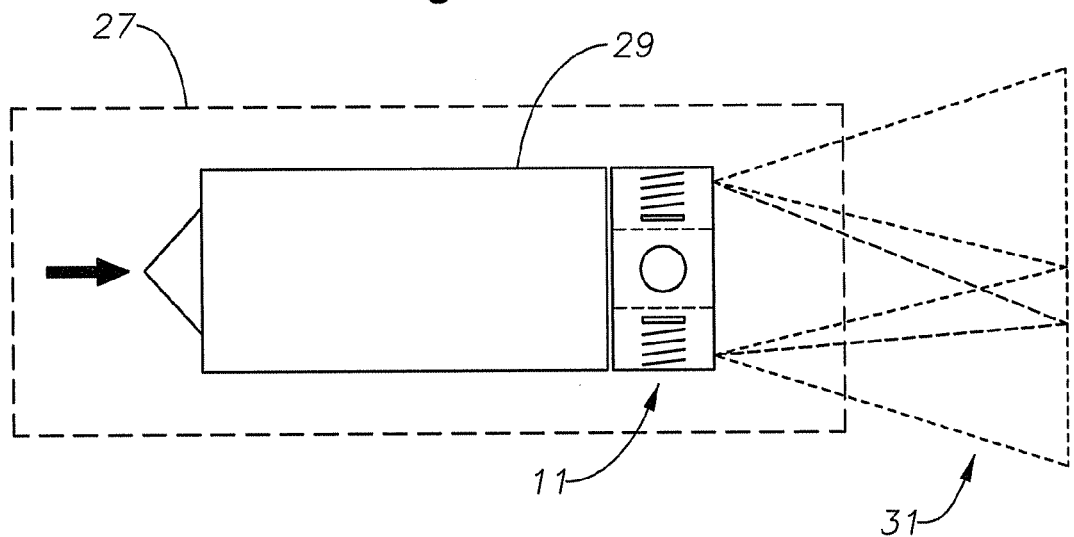
FIG. 5 is a schematic view of a capacitive stator assembly as comprised by the present invention employed in plume signature and thrust vectoring of aircraft or rocket exhaust.

Referring to FIGS. 4 and 5, for conducting materials (i.e., a conductive gas, liquid, or solid) forced through the capacitive stator 11 by an external force (i.e., rocket motor and/or jet engine) as indicated by the arrow, then the electromagnetic signature of the exhaust can be electronically manipulated by the stator 11.

Referring to FIG. 5, a capacitive stator assembly 11 could be employed for use with an aircraft 27. Aircraft 27 may have a rocket or jet engine 29 which is attached to the aircraft 27 and acts to propel the aircraft 27. As the jet engine 29 operates, air is pulled into the engine 29, as indicated by the arrow. Once the air passes through jet engine 29, engine 29 produces exhaust 31. Rocket motor and jet engine 29 exhaust gasses are ionized. A capacitive stator assembly 11 may be connected to the exhaust portion of a jet engine 29, and may be operated to manipulate the aircraft's exhaust plume 31. A static magnetic field will deflect an incoming or outgoing charged particle at right angles. Additionally, a static electric field will deflect an incoming or outgoing charged particle towards or away from one or the other of the electric capacitive plates in each pair 15, 19. By varying the strength of the electric and/or magnetic fields, the moving charged particle can be manipulated similar to an electron beam in a cathode ray tube (CRT), thereby changing the characteristic signature of the exhaust plume.

Figure 6:
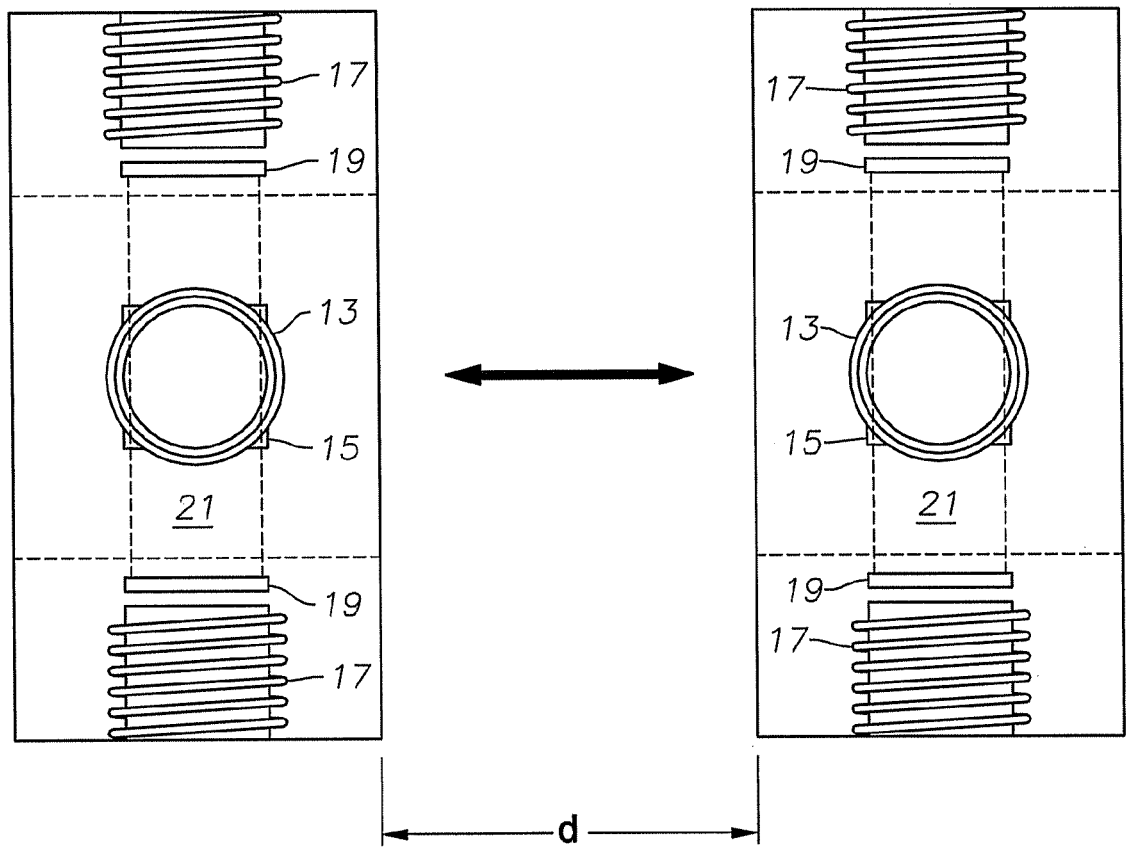
FIG. 6 is a schematic side view of multi-stage capacitive stator assembly as comprised by an alternate embodiment of the present invention.

Multiple capacitive stators 11 are capable of generating complex wave forms such as bead frequency wave forms. Wave forms have 3-variable parameters: magnitude, frequency and phase. The capacitive stator 11 may be employed to create multiple wave forms that in turn create interference patterns. The combining of multiple Lorentz force applications allows for additional complexity in characterization of thrust and/or engine plume. For Example, as illustrated in FIG. 6, two capacitive stators 11 in series allow for bead frequency effects on the exhaust signature. Two capacitive stators 11, as previously described, are placed at a distance d from one another. Gasses, liquids, or solids may pass through one of the capacitive stators 11 before entering the region between the two stators 11. The strongest effect on any gasses, liquids, or solids would be within the cavity 21 of either capacitive stator 11 itself. The capacitive stator 11 may be employed in multiple configurations and complex applications.

Figure 8:
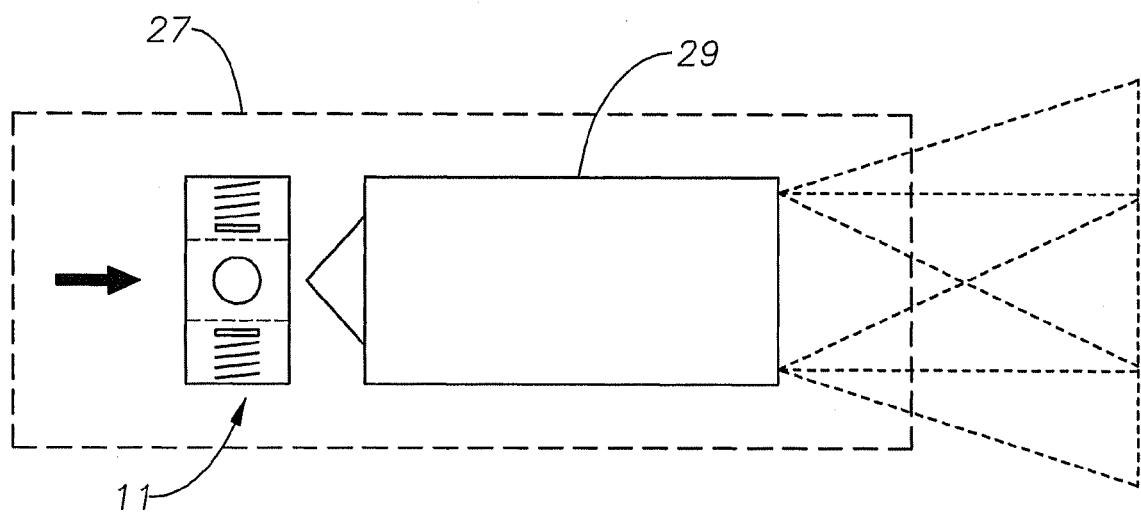
FIG. 8 is a schematic view of a capacitive stator assembly as comprised by the present invention employed in velocity reduction of aircraft intake.

Referring to FIGS. 7 and 8, a capacitive stator 11 may be used to slow air flow into an aircraft 27 jet engine 29 with or without first ionizing the air flow. Capacitive stator 11 functions as previously describe except that in this embodiment, the electric field E and magnetic field B rotate in an opposite direction such that the induced current loop 25 travels counter clockwise and the magnetic force B' and Lorentz force F act against the intake air velocity as indicated by the arrow. Ionized particles face an opposing Lorentz force F, thereby slowing down the intake air velocity. In either case, the capacitive stator 11 would project an electromagnetic wave ahead of the engine 29 (i.e., air craft 27) and thus would disrupt stealth design.

The invention has several advantages due to flexible modes of operation as seen in Table 1. The invention transfers electromagnetic energy from/to the capacitive stator to/from kinetic energy or momentum of matter. The capacitive stator used as an electromagnetic turbine may accelerate or decelerate both charged and uncharged matter. This is achieved directly through the Lorentz force for charged matter and indirectly through a rotating Lorentz force and diamagnetism for uncharged matter. Additionally, the capacitive stator may deflect initially moving charged matter in such a way as to change its non-axial motion as desired. Thus, the capacitive stator may be used as an intake and/or outlet flow control device or plume signature, thrust vectoring device.

TABLE 1

DEVICE ATTRIBUTES

| | CHARGED MATERIALS | UNCHARGED MATERIALS |
|---|---|---|
| AXIAL ACCELERATION/ DECELERATION | Current art: rail guns, ion engines, etc. | Unique rotating Lorentz force with diamagnetic coupling. |
| DEFLECTION | Current art: cathode ray tubes (CRT), etc. Unique application to jet/rocket engine exhaust. | Potential to be determined. |

While the invention has been shown in several forms, it should be apparent to those skilled in the art that it is not so limited but is susceptible to various changes without departing from the scope of the invention.

The invention claimed is:

1. An apparatus for an aircraft or a rocket comprising:
an engine with an outlet through which an engine flow stream passes; and
at least one electromagnetic field generator mounted to the aircraft or mounted to the rocket, the electromagnetic field generator having an internal cavity through which the engine flow stream passes, the at least one electromagnetic field generator creating a circular electromagnetic current loop within the cavity, about an axis of the flow stream, the at least one electromagnetic field generator comprising: a first pair of capacitive plates parallel to one another, a second pair of capacitive plates parallel to one another, the first pair of capacitive plates being arranged perpendicular to the second pair of capacitive plates, each capacitive plate of the second pair of capacitive plates being out-of-phase with each adjacent one of the first pair of capacitive plates; the internal cavity located between the first pair of capacitive plates and the second pair of capacitive plates; a first pair of magnetic coils, each magnetic coil of the first pair of magnetic coils aligned behind a respective one of said plates of the first pair of capacitive plates and electrically connected to a respective one of said plates of the second pair of capacitive plates such that the first pair of magnetic coils and the second pair of capacitive plates are in-phase with one another, and a second pair of magnetic coils, each magnetic coil of the second pair of magnetic coils aligned behind a respective one of said plates of the second pair of capacitive plates and electrically connected to a respective one of said plates of the first pair of capacitive plates such that the second pair of magnetic coils and the first pair of capacitive plates are in-phase with one another.

2. The apparatus of claim 1, further comprising:
an engine inlet through which the flow stream passes, and wherein the at least one electromagnetic field generator is mounted at the inlet of the engine.

3. The apparatus of claim 1, wherein the at least one electromagnetic field generator is mounted at the outlet of the engine.

4. An apparatus for an aircraft or a rocket comprising:
an engine with an outlet; and
means for modifying an exhaust plume of the engine comprising at least one electromagnetic field generator for generating complex wave forms, mounted to the aircraft or the rocket adjacent an exhaust duct of the engine, the at least one electromagnetic field generator comprising:
a first pair of capacitive plates parallel to one another;
a second pair of capacitive plates parallel to one another, the first pair of capacitive plates being arranged perpendicular to the second pair of capacitive plates, each capacitive plate of the second pair of capacitive plates being out-of-phase with each adjacent one of the first pair of capacitive plates, a first pair of magnetic coils, each magnetic coil of the first pair of magnetic coils located behind a respective one of said plates of the first pair of capacitive plates and electrically connected to a respective one of said plates of the second pair of capacitive plates such that the first pair of magnetic coils and the second pair of capacitive plates are in-phase with one another; a second pair of magnetic coils, each magnetic coil of the second pair of magnetic coils located behind a respective one of said plates of the second pair of capacitive plates and electrically connected to a respective one of said plates of the first pair of capacitive plates such that the second pair of magnetic coils and the first pair of capacitive plates are in-phase with one another; and a hollow internal cavity located between the first pair of capacitive plates and the second pair of capacitive plates for passage of the exhaust plume.

5. An apparatus for modifying an aircraft engine flow stream or a rocket engine flow stream comprising:
a first pair of capacitive plates parallel to one another;
a second pair of capacitive plates parallel to one another, the first pair of capacitive plates being arranged perpendicular to the second pair of capacitive plates, each capacitive plate of the second pair of capacitive plates being out-of-phase with each adjacent one of the first pair of capacitive plates; a first pair of magnetic coils, each magnetic coil located behind a respective one of the first pair of capacitive plates and electrically connected to a respective one of said plates of the second pair of capacitive plates such that the first pair of magnetic coils and the second pair of capacitive plates are in-phase with one another; a second pair of magnetic coils, each magnetic coil located behind a respective one of the second pair of capacitive plates and electrically connected to a respective one of said plates of the first pair of capacitive plates such that the second pair of magnetic coils and the first pair of capacitive plates are in-phase with one another; and a hollow internal cavity located between the first pair of capacitive plates and the second pair of capacitive plates for passage of a flow stream.

6. A method of modifying an aircraft engine flow stream or a rocket engine flow stream comprising:
(a) mounting at least one electromagnetic field generator to an aircraft or a rocket within the path of an aircraft or rocket engine flow stream, the at least one electromagnetic field generator comprising first and second pairs of magnetic coils, first and second pairs of capacitive plates interconnected therewith; and an internal cavity located between the first pair of capacitive plates and located between the second pair of capacitive plates; the first pair of capacitive plates being not parallel to the second pair of capacitive plates, each capacitive plate of the second pair of capacitive plates being out-of-phase with each adjacent one of said plates of the first pair of capacitive plates, each magnetic coil of the first pair of magnetic coils aligned behind a respective one of said plates of the first pair of capacitive plates and electrically connected to a respective one of said plates of the second pair of capacitive plates, and each magnetic coil of the second pair of magnetic coils aligned behind a respective one of said plates of the second pair of capacitive plates and electrically connected to a respective one of said plates of the first pair of capacitive plates; (b) inducing electromagnetic radiation to produce a propagating electromagnetic wave and to induce an electromagnetic current loop within the internal cavity about an axis of the flow stream; and (c) passing the aircraft engine flow stream or the rocket engine flow stream through the internal cavity of the at least one electromagnetic field generator.

7. The method of claim 6, wherein the aircraft engine flow stream or the rocket engine flow stream is ionized.

8. The method of claim 6, wherein the aircraft engine flow stream or the rocket engine flow stream is non-ionized.

9. The method of claim 6, wherein step (a) further comprises mounting the at least one electromagnetic field generator to the inlet of an aircraft engine.

10. The method of claim 6, wherein step (a) further comprises mounting the at least one electromagnetic field generator to an exhaust duct of an aircraft engine or an exhaust duct of a rocket engine, and changing a direction of a corresponding engine or rocket exhaust plume associated therewith.

11. The method of claim 6, wherein step (c) further comprises reducing the velocity of the aircraft engine flow stream or the rocket engine flow stream in response to the electromagnetic radiation.

12. The method of claim 6, wherein step (c) further comprises increasing the velocity of the aircraft engine flow stream or the rocket engine flow stream in response to the electromagnetic radiation.

13. The method of claim 6, wherein step (c) further comprises rotating the aircraft engine flow stream or the rocket engine flow stream in response to the electromagnetic radiation.

14. The method of claim 8, wherein the electromagnetic radiation generates a circulating Lorentz force, thereby inducing a propagating magnetic dipole which couples to a diamagnetic material's diamagnetic properties at a specific frequency associated therewith.

15. A method of modifying an aircraft engine exhaust plume or a rocket engine exhaust plume comprising:

(a) mounting at least one electromagnetic field generator to an aircraft engine or a rocket engine within the path of the aircraft engine exhaust plume or the rocket engine exhaust plume, the at least one electromagnetic field generator having an internal cavity, the at least one electromagnetic field generator including a first pair of capacitive plates parallel to one another, a second pair of capacitive plates parallel to one another, the first pair of capacitive plates being arranged perpendicular to the second pair of capacitive plates, each capacitive plate of the second pair of capacitive plates being out-of-phase with each adjacent one of the first pair of capacitive plates; an internal cavity located between the first pair of capacitive plates and the second pair of capacitive plates; a first pair of magnetic coils, each magnetic coil of the first pair of magnetic coils aligned behind a respective one of said plates of the first pair of capacitive plates and electrically connected to a respective one of said plates of the second pair of capacitive plates such that the first pair of coils and the second pair of capacitive plates are in-phase with one another, and a second pair of magnetic coils, each magnetic coil of the second pair of magnetic coils aligned behind a respective one of said plates of the second pair of capacitive plates and electrically connected to a respective one of said plates of the first pair of capacitive plates such that the second pair of magnetic coils and the first pair of capacitive plates are in-phase with one another, to provide for generating complex waveforms;

(b) inducing electromagnetic radiation within the internal cavity of the at least one electromagnetic field generator; and (c) passing the aircraft engine exhaust plume or the rocket engine exhaust plume through the internal cavity of the at least one electromagnetic field generator.

16. The method of claim 15, wherein step (c) further comprises increasing the velocity of the aircraft engine exhaust plume or the rocket engine exhaust plume in response to the electromagnetic radiation.

17. The method of claim 15, wherein step (c) further comprises rotating the aircraft engine exhaust plume or rocket engine exhaust plume in response to the electromagnetic radiation.

18. The method of claim 15, wherein step (c) further comprises generating a circulating Lorentz force; and wherein the method of claim 17 further comprises: inducing a propagating magnetic dipole which couples to a material's diamagnetic properties at a specific frequency.

19. The apparatus of claim 1, wherein the opposing geometries of the first pair of magnetic coils and the second pair of magnetic coils and the opposing geometries of first pair of capacitive plates and the second pair of capacitive plates provide for generating complex waveforms.

* * * * *